March 19, 1957 W. MARTIN ET AL 2,786,173
MOTOR CONTROL SYSTEM
Filed March 3, 1954 2 Sheets-Sheet 1

INVENTORS
WILLIAM MARTIN
WARREN D. LANGE
BY
THEIR ATTORNEY

United States Patent Office 2,786,173
Patented Mar. 19, 1957

2,786,173

MOTOR CONTROL SYSTEM

William Martin, Detroit, and Warren D. Lange, Lincoln Park, Mich., assignors to General Motors Corporation, Detroit, Mich., a corporation of Delaware Application March 3, 1954, Serial No. 413,870

1 Claim. (Cl. 318—348)

This invention relates to motor control systems and is particularly concerned with a motor control system wherein heat generated by control of the motor is dissipated to a major extent at a point remote to the control device used in the operation.

It is therefore the main object of the invention to provide a cool motor control, for example, a rheostat which may be placed at a point accessible to an operator, which rheostat is placed in parallel with a resistor positioned remote from the operator whereby a division of current through the rheostat and resistor is obtained so that the major portion of the heat dissipated during the control of the motor occurs at a point remote from the rheostat.

Another object of the invention is to provide a speed control system for automotive forced air heater units wherein the motor for driving the heater fan or blower is controlled by a rheostat, which rheostat is positioned on the dashboard of the vehicle and is in parallel with a resistor which carries a predetermined portion of the current, which resistor is remotely positioned from the dashboard, the resistance of the rheostat and resistor being so proportioned that the major portion of heat dissipated during the control of the operation occurs at a point remote from the dashboard, thereby eliminating possible injury to the dashboard and excessive heat in proximity thereto.

A still further object of the invention is to provide a motor control system for controlling the speed of D. C. motors wherein sensitivity of adjustment of the system is enhanced by the use of parallel resistors, one of which is adjustable, and wherein the major portion of the heat generated by the control is dissipated at a point remote from the adjustable resistor.

Further objects and advantages of the present invention will be apparent from the following description, reference being had to the accompanying drawings, wherein preferred embodiments of the present invention are clearly shown.

In the control of electric motors, for example, heater motors for driving fans and blowers in automotive vehicles, the speed of the motor and the amount of heat circulated into the interior of the automobile is controlled by the position of a rheostat in circuit with the motor.

It has been found that in past applications, the use of a single variable resistance, such as a rheostat to control this motor speed yields undesirable heat factors since the rheostat is generally mounted on the dashboard of the car and, when the fan motor is running at low speeds, the heat generated in the resistor is so intense that its dissipation beneath the dashboard overheats the dashboard and, in some cases, deleteriously effects electrical wiring in close proximity to the rheostat. Furthermore, the overheating of the dashboard causes disfigurement of the finish thereof. For this reason, it is desirable to overcome the excessive dissipation and generation of heat in proximity to the dashboard while still leaving a rheostat control mounted thereon.

In order to accomplish this condition, we have found that two resistors may be utilized, one of which is variable and the other of which is fixed, which resistors are connected in parallel and are positioned from one another. With this arrangement, it is possible to obtain greater sensitivity of motor control while simultaneously dissipating the major portion of the heat generated by the overall control at a point remote from the dashboard by the simple expedient of mounting the fixed resistor portion of the control at some point remote from the dashboard, for example, on the external surface of the automotive firewall. In this manner and with properly balanced resistors, the rheostat may be used to control motor speed while the externally mounted resistor dissipates the major portion of the heat at a point remote from the dashboard. It is to be understood that the resistance element of the system therefor consists of two parts since these two parts act together to yield the improved sensitivity of adjustment of the motor and the desired heat pattern.

Figure 1:
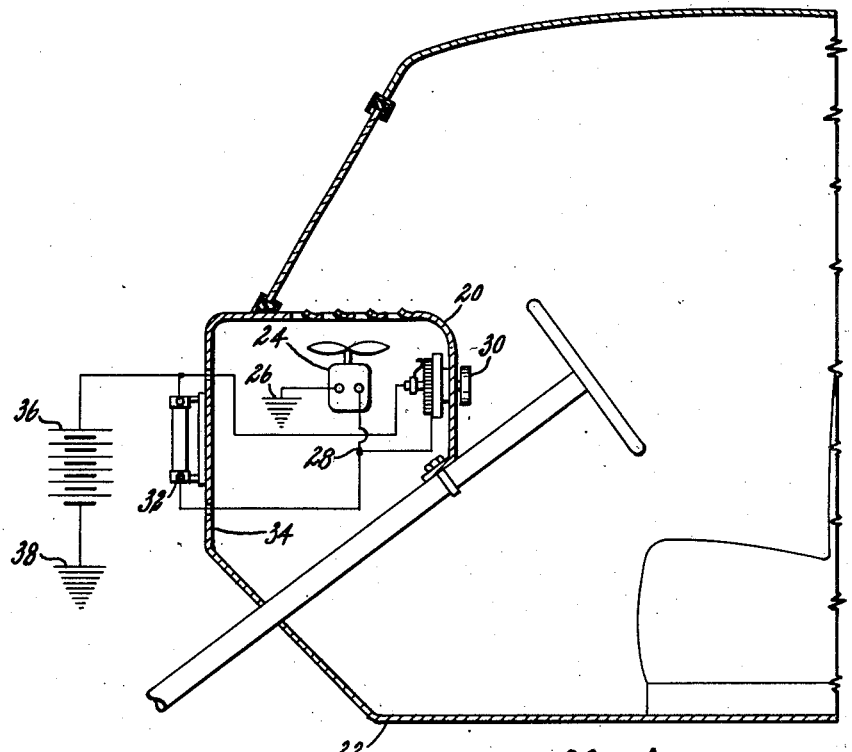
Fig. 1 is a diagrammatic view in section of a motor control unit in connection with a motor driven fan positioned beneath the dashboard of an automobile.

Referring particularly to the drawings, Fig. 1 diagrammatically shows a dashboard 20 of an automobile 22 where a D. C. fan motor 24 is suitably mounted beneath the dashboard 20. One side of the motor is grounded as at 26 while the other side of the motor 28 is connected to one side of a rheostat 30 and to one side of a resistor element 32 mounted on the outside of a firewall 34. The other side of rheostat 30 is connected to the other side of the resistor 32 and to one side of a battery 36, the other pole of which is grounded as at 38.

Figure 2:
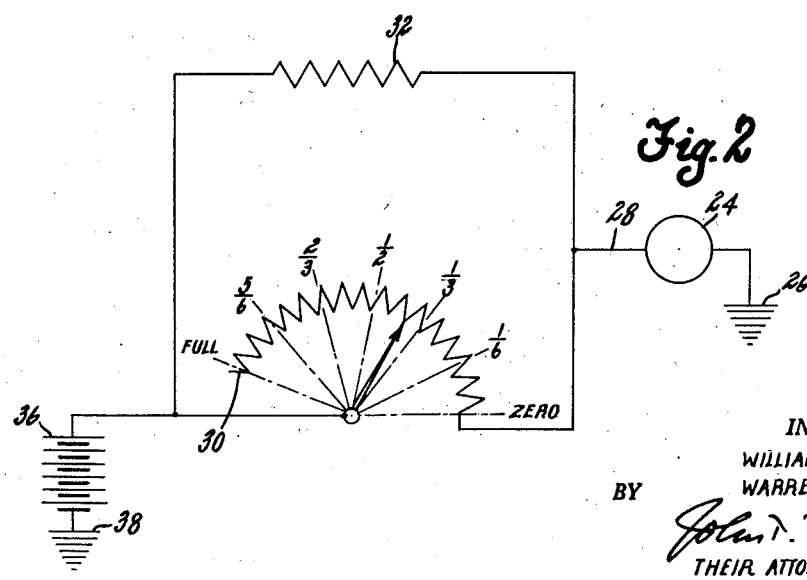
Fig. 2 is the electrical hookup of the motor control system used.
Figure 3:
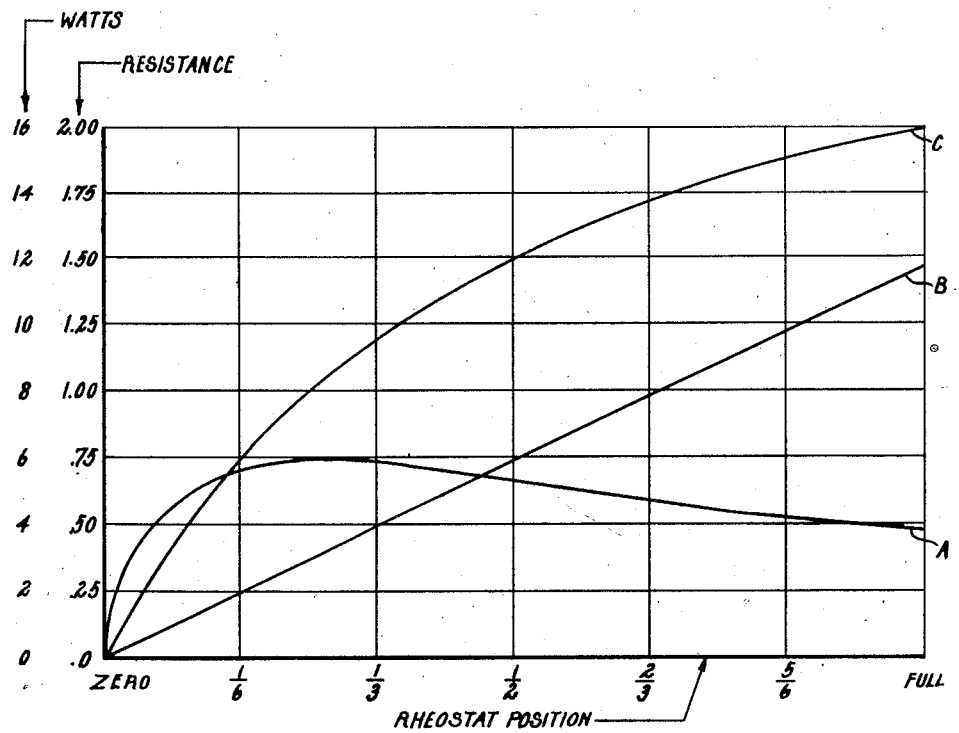
Fig. 3 is a chart showing the difference in heat generated by the rheostat at various positions of resistance control, both for the improved motor control system as disclosed herein and for a conventional simple motor control system utilizing a single variable resistor.

The wiring diagram of this setup is more clearly shown in Fig. 2 wherein the external resistor 32 and rheostat 30 are shown together with the motor 24. In this connection and as one specific example of the proper resistor balance, if the resistance of the blower or fan motor 24 is in the order of three ohms, the external resistor 32 should likewise have a resistance of about three ohms while the variable resistor or rheostat 30 should be in the order of six ohms. Since the reciprocal of the overall resistance of parallel circuited resistors is equal to the sum of the reciprocals of the various resistances, the resistance of the parallel circuit including the rheostat 30 and the resistor 32, will therefore be two ohms when the rheostat is in the "full" position. When the rheostat 30 is in this position, twice as much current will flow through the fixed resistor 32, as will flow through the rheostat 30. The heat generated in each resistor will be the product of the square of the current and the resistance; therefore twice as much heat is generated in the fixed resistor 32, as is generated in the rheostat 30, or in other words, one-third of the total heat developed will be in the rheostat 30 while the remaining two-thirds will be in the fixed resistor 32. Thus it can be seen that, with this circuit, the major portion of the heat generated by the current passing through the resistances will be present at the outside of the firewall and remote from the dashboard. It is apparent that, as the rheostat 30 is adjusted clockwise to reduce its resistance, the total resistance of the two parallel resistances will also be reduced, so that when the rheostat 30 is in the "zero" position, there will be no resistance in series with the motor 24. When the rheostat 30 is in the "zero" position, all the current will pass through the rheostat 30 and no current will pass through resistor 32. No heat will be generated in the rheostat 30 since its resistance is zero; no heat will be generated in resistor 32, since there is no current flow through that resistor. Variation of resistance and heat developed with adjustment of the rheostat 30 is shown graphically in Fig. 3. Curve C represents the total resistance of the two resistors at various positions of the rheostat 30. Curve A represents the heat generated in the rheostat 30. Curve B represents the heat that would be generated in a single rheostat used in the conventional manner, to control motor speed.

As previously stated, another of the benefits of the present system is the increased sensitivity of adjustment since it is apparent that movement of the rheostat in either direction through a predetermined range will not cause as great a fluctuation in motor speed as would be caused where the rheostat is the sole resistance in the circuit. In other words, the adjustment is not as "rough" and is more sensitive to close adjustment since the rheostat must be moved through a greater arc to obtain the desired adjustment.

The present system has proven particularly desirable in automotive vehicles for the reasons heretofore discussed although it is obvious that such a system may be used in other applications with equal success whenever a reduction in heat dissipation at a given point is desired.

In order to obtain the desired balance in a hookup of this character, the rheostat resistance should be about twice the resistance of the motor being controlled while the fixed rheostat mounted apart therefrom should be about equal to the resistance of the motor being controlled. In this manner, functions having general characteristics as shown in the curves are obtained.

It is manifest that the term "fixed resistor," as used herein, is limited to a resistor that is not generally adjusted for motor control purposes. In other words, the fixed resistor need only be fixed with respect to a given set of conditions and may be adjustable, when desired, to comply with other conditions. Thus the fixed resistor 32 may be of an adjustable type for facilitating installation of the unit in varying environments.

While the embodiments of the present invention as herein disclosed, constitute preferred forms, it is to be understood that other forms might be adopted.

What is claimed is as follows:

The combination, comprising, a motor control system for use in an automotive vehicle, including, a firewall, a dashboard associated with said firewall inside a passenger compartment of the vehicle, a fixed resistance low torque D. C. motor to be controlled and operated continuously over extended periods of time, a rheostat mounted on said dashboard and having a maximum resistance about twice the resistance of said motor, a fixed resistor connected in parallel with said rheostat and having a resistance equal to about one-half the resistance of said rheostat mounted remote from said dashboard on said firewall outside the passenger compartment, and a battery connected in series with said motor and said parallel-connected rheostat and resistor whereby the major portion of the heat dissipated in the motor control system is dissipated at a point remote from said dashboard and outside the passenger compartment.

References Cited in the file of this patent

UNITED STATES PATENTS

| | | |
|---|---|---|
| 1,821,091 | Date | Sept. 1, 1931 |
| 2,557,534 | Cowles | June 19, 1951 |
| 2,630,556 | Dyer | Mar. 3, 1953 |